United States Patent
Zhu et al.

(10) Patent No.: US 12,487,032 B1
(45) Date of Patent: Dec. 2, 2025

(54) STEPWISE GAS DISTRIBUTION AND GRADED OXYGEN SUPPLEMENTATION DEVICE FOR DISTRIBUTION OF HIGH-RATIO CIRCULATING FLUE GAS

(71) Applicant: Institute of Process Engineering, Chinese Academy of Sciences, Beijing (CN)

(72) Inventors: Tingyu Zhu, Beijing (CN); Wenqing Xu, Beijing (CN); Yang Yang, Beijing (CN); Chaoqun Li, Beijing (CN)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/250,749

(22) Filed: Jun. 26, 2025

(30) Foreign Application Priority Data

Sep. 28, 2024 (CN) .......................... 202411364090.2

(51) Int. Cl.
*F27D 17/30* (2025.01)
*F27D 17/10* (2025.01)

(52) U.S. Cl.
CPC ........... *F27D 17/302* (2025.01); *F27D 17/10* (2025.01)

(58) Field of Classification Search
None
See application file for complete search history.

(56) References Cited

FOREIGN PATENT DOCUMENTS

| CN | 113390269 A | 9/2021 |
|---|---|---|
| CN | 113551525 A | 10/2021 |
| CN | 116793097 A | 9/2023 |
| CN | 220541777 U | 2/2024 |
| CN | 118532954 A | 8/2024 |

OTHER PUBLICATIONS

Notification to Grant Patent Right for Invention dated Apr. 21, 2025 in SIPO application No. CN202411364090.2, 3 pages.
Retrieval report-First search dated Mar. 26, 2025 in SIPO application No. CN202411364090.2, 4 pages.

*Primary Examiner* — Jason Lau
(74) *Attorney, Agent, or Firm* — Cooper Legal Group, LLC

(57) ABSTRACT

A stepwise gas distribution and graded oxygen supplementation device for distribution of high-ratio circulating flue gas is provided. The circulating flue gas distribution main pipe includes stepped sections communicated with each other in sequence, and pipe diameters of the stepped sections are reduced in sequence along a flue gas moving direction. The circulating flue gas distribution branch pipes are each in communication with and arranged at one side of the corresponding stepped section. The flue gas sealing cover is in communication with gas outlet ends of the circulating flue gas distribution branch pipes. The oxygen supplementing devices are arranged in the circulating flue gas distribution branch pipes needing to increase oxygen content. The oxygen supply device is in communication with gas inlet ends of the oxygen supplementing devices.

5 Claims, 2 Drawing Sheets

STEPWISE GAS DISTRIBUTION AND GRADED OXYGEN SUPPLEMENTATION DEVICE FOR DISTRIBUTION OF HIGH-RATIO CIRCULATING FLUE GAS

CROSS-REFERENCE TO RELATED APPLICATIONS

This application claims priority to Chinese Patent Application No. 202411364090.2, filed on Sep. 28, 2024, the contents of which are hereby incorporated by reference.

TECHNICAL FIELD

The disclosure belongs to the technical field of sintering flue gas circulation, and in particular relates to a stepwise gas distribution and graded oxygen supplementation device for distribution of high-ratio circulating flue gas.

BACKGROUND

Sintering flue gas circulation technology is to recycle part of sintering hot waste gas, reduce the amount of exhaust gas while recycling part of waste gas waste heat, reduce the treatment load of flue gas purification facilities and reduce the consumption of sintering solid fuel.

Sintering flue gas circulation technology, as the mainstream technology of green upgrading and transformation of sintering machine, has been applied in some areas at present, and the general flue gas circulation rate is between 15% and 20%. By increasing the flue gas circulation rate, the emission of sintering flue gas may be significantly reduced, the high-temperature decomposition of carbon monoxide (CO) and dioxins in flue gas may be strengthened, and the catalytic reduction of nitrogen oxides (NOX) may be promoted. However, when the circulation rate is increased to more than 30%, the oxygen content in the sintering process will be reduced. Additionally, the high-temperature exhaust gas with large gas volume will return to the surface of sintering material layer, and if it is unevenly distributed, it is easy to cause flue gas overflow and cause safety hazards. Therefore, how to realize the uniform distribution of large gas volume flue gas and break through the problem of low oxygen sintering is the key to realize high-proportion flue gas circulation.

SUMMARY

The objective of the present disclosure is to provide a stepwise gas distribution and graded oxygen supplementation device for distribution of high-ratio circulating flue gas, so as to solve the above problems.

To achieve the above objective, the present disclosure provides the following solution:
  a stepwise gas distribution and graded oxygen supplementation device for distribution of high-ratio circulating flue gas, including:
  a circulating flue gas distribution main pipe, where the circulating flue gas distribution main pipe includes multiple stepped sections sequentially in communication with each other, and pipe diameters of the multiple stepped sections are reduced in sequence along a flue gas moving direction; and oxygen content demands of the multiple stepped sections arranged along the flue gas moving direction increase in sequence, and gas volume demands decrease in sequence;
  multiple circulating flue gas distribution branch pipes, each in communication with and arranged at one side of a corresponding one of the stepped sections;
  a flue gas sealing cover in communication with gas outlet ends of the multiple circulating flue gas distribution branch pipes;
  oxygen supplementing devices arranged in the circulating flue gas distribution branch pipes needing to increase oxygen content; and
  an oxygen supply device in communication with gas inlet ends of the oxygen supplementing devices.

In some embodiments, the oxygen supplementing devices are arranged in the circulating flue gas distribution branch pipes located in final one-third length range of the circulating flue gas distribution main pipe along the flue gas moving direction.

In some embodiments, the oxygen supplementing devices include multiple oxygen supplementing gas branch pipes, where the oxygen supplementing gas branch pipes are located below the respective circulating flue gas distribution branch pipes, the oxygen supplementing gas branch pipes are obliquely inserted into middle parts of the respective circulating flue gas distribution branch pipes, gas outlet ends of the oxygen supplementing gas branch pipes are in communication with the respective circulating flue gas distribution branch pipes, the gas outlet ends of the oxygen supplementing gas branch pipes are arranged close to the flue gas sealing cover, gas inlet ends of the oxygen supplementing gas branch pipes are arranged close to the circulating flue gas distribution main pipe, and the gas inlet ends of the multiple oxygen supplementing gas branch pipes are in communication with gas outlet ends of the oxygen supply device.

In some embodiments, middle parts of inner sides of the circulating flue gas distribution branch pipes are provided with conical flow guide devices, tips of the conical flow guide devices are arranged towards the flue gas sealing cover, and the gas outlet ends of the oxygen supplementing gas branch pipes are arranged towards side walls of the conical flow guide devices.

In some embodiments, the oxygen supply device includes an oxygen supplementing gas main pipe, where a side wall of the oxygen supplementing gas main pipe is in communication with the gas inlet ends of the multiple oxygen supplementing gas branch pipes, and adjusting parts for adjusting oxygen flow are arranged between the oxygen supplementing gas main pipe and the oxygen supplementing gas branch pipes.

In some embodiments, the adjusting parts include oxygen supplementing gas inlet adjusting valves, where ends of the oxygen supplementing gas inlet adjusting valves are in communication with the side wall of the oxygen supplementing gas main pipe, and other ends of the oxygen supplementing gas inlet adjusting valves are in communication with the gas inlet ends of the oxygen supplementing gas branch pipes.

In some embodiments, each of the oxygen supplementing gas inlet adjusting valves is one of an adjustable single-board valve, a butterfly valve and a gate valve.

Compared with the prior art, the disclosure has the following advantages and technical effects.

According to the different gas volume demand and oxygen content demand of each part of the circulating flue gas distribution main pipe, the disclosure adopts a stepped variable-diameter structure to realize the cascade distribution of circulating flue gas volume, the on-demand distribution of circulating flue gas on the sintering material surface is realized, the proportion of circulating flue gas is effectively increased to more than 35%. The oxygen supplementing device is added to the circulating flue gas distribution branch pipe that needs oxygen supply, so as to supply oxygen to the corresponding circulating flue gas distribution branch pipe according to the actual oxygen content demand. The graded oxygen supplement is achieved in the process of high-proportion flue gas circulation, the limitation of circulating oxygen content in flue gas on circulation rate and the adverse influence on production are overcome, and the device is simple and reliable in structure.

BRIEF DESCRIPTION OF THE DRAWINGS

In order to explain the embodiments of the present disclosure or the technical solution in the prior art more clearly, the drawings needed in the embodiments will be briefly introduced below. Apparently, the drawings in the following description are only some embodiments of the present disclosure. For those of ordinary skill in the art, other drawings may be obtained according to these drawings without paying creative effort.

DETAILED DESCRIPTION OF THE EMBODIMENTS

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

In order to make the above objects, features and advantages of the present disclosure more obvious and easier to understand, the present disclosure will be further described in detail with the attached drawings and specific embodiments.

Figure 1:
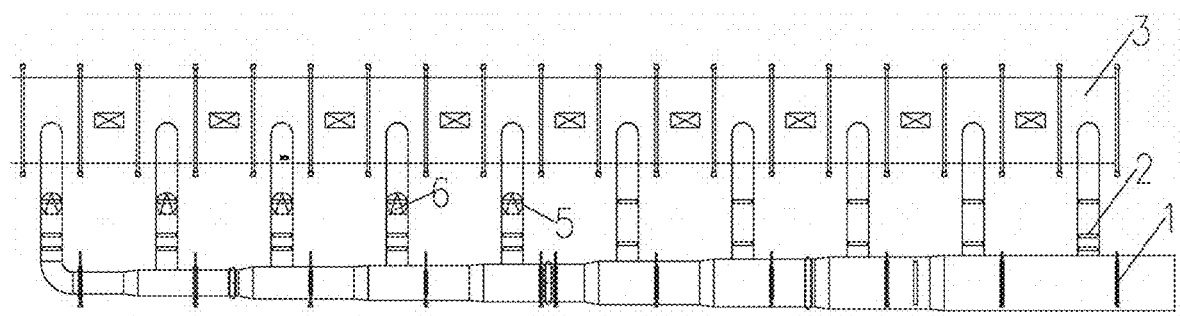
FIG. 1 is a schematic structural diagram of the present disclosure.
Figure 2:
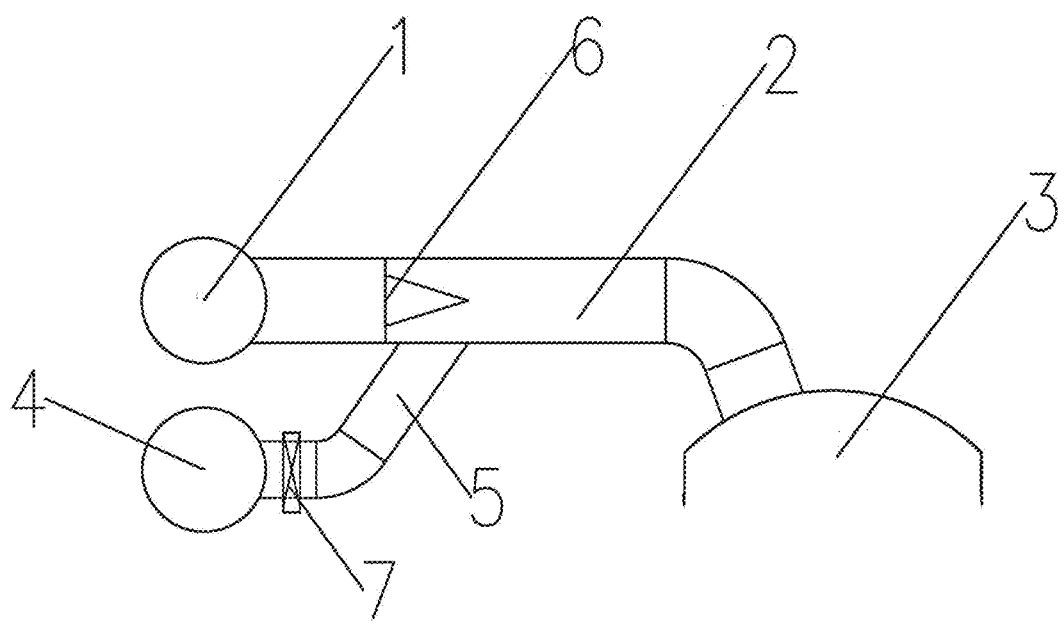
FIG. 2 is a schematic structural diagram of an oxygen supplementing device of the present disclosure.

With reference to FIG. 1 to FIG. 2, a stepwise gas distribution and graded oxygen supplementation device for distribution of high-ratio circulating flue gas is provided, which includes: a circulating flue gas distribution main pipe 1, multiple circulating flue gas distribution branch pipes 2, a flue gas sealing cover 3, oxygen supplementing devices and an oxygen supply device.

The circulating flue gas distribution main pipe 1 includes multiple stepped sections in communication with each other in sequence, and pipe diameters of the multiple stepped sections are reduced in sequence along a flue gas moving direction; and oxygen content demands of the multiple stepped sections arranged along the flue gas moving direction increase in sequence, and gas volume demands decrease in sequence.

The circulating flue gas distribution branch pipe 2 is in communication with and arranged at one side of the corresponding stepped section.

The flue gas sealing cover 3 is in communication with gas outlet ends of the multiple circulating flue gas distribution branch pipes 2.

The oxygen supplementing device is arranged in the circulating flue gas distribution branch pipe 2 needing to increase oxygen content.

The oxygen supply device is in communication with gas inlet ends of the oxygen supplementing devices.

The circulating flue gas distribution main pipe 1 is arranged parallel to the length direction of the sintering machine and above one side of the sintering machine, and the flue gas sealing cover 3 covers the sintering machine.

According to the different gas volume demands and oxygen content demands of parts of the circulating flue gas distribution main pipe 1, the disclosure adopts a stepped variable-diameter structure to realize the cascade distribution of circulating flue gas volume, the on-demand distribution of circulating flue gas on the sintering material surface is realized, the proportion of circulating flue gas is effectively increased to more than 35 percent (%), and the oxygen supplementing device is added to the circulating flue gas distribution branch pipe 2 that needs oxygen supply, so as to supply oxygen to the corresponding circulating flue gas distribution branch pipe 2 according to the actual oxygen content demand. The graded oxygen supplement is achieved in the process of high-proportion flue gas circulation, the limitation of circulating oxygen content in flue gas on circulation rate and the adverse influence on production are overcome, and the device is simple and reliable in structure.

In a further embodiment, the oxygen supplementing devices are arranged in the circulating flue gas distribution branch pipes 2 located in the final ⅓ length range of the circulating flue gas distribution main pipe 1 along the flue gas moving direction.

In a further embodiment, the oxygen supplementing devices include oxygen multiple supplementing gas branch pipes 5. The oxygen supplementing gas branch pipes 5 are respectively located below the circulating flue gas distribution branch pipes 2, the oxygen supplementing gas branch pipes 5 are respectively obliquely inserted into middle parts of the circulating flue gas distribution branch pipes 2. The gas outlet end of the oxygen supplementing gas branch pipe 5 is in communication with the corresponding circulating flue gas distribution branch pipe 2, the gas outlet end of the oxygen supplementing gas branch pipe 5 is arranged close to the flue gas sealing cover 3, the gas inlet end of the oxygen supplementing gas branch pipe 5 is arranged close to the circulating flue gas distribution main pipe 1. The gas inlet ends of the multiple oxygen supplementing gas branch pipes 5 are in communication with gas outlet ends of the oxygen supply device.

In a further embodiment, the middle part of the inner side of the circulating flue gas distribution branch pipe 2 is provided with a conical flow guide device 6. The tip of the conical flow guide device 6 is arranged towards the flue gas sealing cover 3, and the gas outlet end of the oxygen supplementing gas branch pipe 5 is arranged towards the side wall of the conical flow guide device 6.

In a further embodiment, the oxygen supply device includes an oxygen supplementing gas main pipe 4, the side wall of the oxygen supplementing gas main pipe 4 is in communication with the gas inlet ends of the multiple oxygen supplementing gas branch pipes 5. An adjusting part for adjusting oxygen flow is arranged between the oxygen supplementing gas main pipe 4 and the oxygen supplementing gas branch pipe 5.

In a further embodiment, the adjusting part includes an oxygen supplementing gas inlet adjusting valve 7. One end of the oxygen supplementing gas inlet adjusting valve 7 is in communication with the side wall of the oxygen supplementing gas main pipe 4, and the other end of the oxygen supplementing gas inlet adjusting valve 7 is in communication with the gas inlet end of the oxygen supplementing gas branch pipe 5.

In a further embodiment, the oxygen supplementing gas inlet adjusting valve 7 is selected from the group consisting of an adjustable single-board valve (e.g. flap valve), a butterfly valve, and a gate valve (e.g. slide gate valve).

In order to solve the problem of low oxygen and large gas volume in high-proportion circulation, the gas volume distribution and oxygen demand on the surface of sintering material layer are systematically studied. It is found that along the length direction of sintering machine, due to different sintering stages, the gas permeability of the material layer is obviously different and the demand for oxygen content is also different.

In the initial sintering stage (from the front end of the sintering machine to ⅓ of its length, i.e., the front portion of the sintering machine), the sintering reaction mainly occurs on the surface of the material layer. The combustion is fragile. The demand for oxygen is high, and the demand for gas volume is low. Therefore, the oxygen content of the circulating flue gas needs to be above 18%, and the gas volume is about 50% of the average gas volume.

In the stable sintering stage (from ⅓ to ⅔ of its length of the sintering machine, i.e. the middle portion of the sintering machine), the sintering reaction mainly occurs in the middle of the material layer. Due to the existence of the burning layer and the over-wet layer, the material layer has poor gas permeability, but the combustion is relatively stable, and both gas volume demand and oxygen content demand are relatively low. The oxygen content of circulating flue gas is above 16%, and the gas volume is 50%-100% of the average gas volume.

In the final sintering stage (from ⅔ of the length of the sintering machine to the rear end the sintering machine, i.e., the rear portion of the sintering machine), the sintering reaction mainly occurs at the bottom of the material layer. At this time, the over-wet layer and the original material layer disappear, the gas permeability of the material layer is improved, and the combustion reaction is over. The demand for oxygen is the lowest, and the demand for gas volume is high. The oxygen content of circulating flue gas is above 10%, and the gas volume is 100%-150% of the average gas volume.

Based on the above findings, according to the different gas volume demands in the various stage, the circulating flue gas distribution main pipe 1 is set as a variable-diameter structure to realize the preliminary gas distribution, the oxygen supplementing gas branch pipe 5 is provided in the circulating flue gas distribution branch pipe 2 communicating within the front ⅓ of the sintering machine, the oxygen supplementing gas inlet adjusting valve 7 is installed at the inlet of the oxygen supplementing gas branch pipe 5 to control the oxygen supplementing gas flow, and directly distribute the oxygen supplementing gas in the circulating flue gas distribution branch pipe 2 at the outlet of the oxygen supplementing gas branch pipe 5, thereby realizing the stepwise oxygen supplementation.

A conical flow guide device 6 is arranged in the circulating flue gas distribution branch pipe 2 at the outlet of the oxygen supplementing gas branch pipe 5, so as to adjust and control the ratio of circulating flue gas to oxygen supplementing gas and realize high oxygen content and low gas volume sintering. The conical flow guide device 6 may effectively adjust the circulating gas volume and guide the oxygen supplementing gas. The conical flow guide device 6 arranged at the outlet of the oxygen supplementing gas branch pipe 5 has a conical top pointing to the gas flow direction of circulating flue gas and a bottom facing the gas flow direction. When the amount of circulating flue gas increases, the windward area of the bottom is large, which may effectively reduce the gas volume of circulating flue gas entering the flue gas sealing cover 3 through turbulence. According to the principle of pipeline communication, the redundant circulating flue gas is automatically distributed into the circulating flue gas distribution branch pipe 2 without conical flow guide device 6, that is, the circulating flue gas distribution branch pipe 2 with high gas volume demand at the tail, so as to realize the automatic distribution of flue gas under large gas volume. The gas outlet end of the oxygen supplementing gas branch pipe 5 is opposite to the side face of the conical flow guide device, and the oxygen supplementing gas is guided by the side face angle of the flow guide device, so that the gas flow may flow into the main flow direction of the circulating flue gas more conveniently, thus avoiding the turbulence caused by the mixing of two gas flows, thereby avoiding the vibration and abrasion of the pipeline. By combining the new flue gas distribution branch pipe and the conventional variable-diameter distribution structure, the cascade gas distribution and graded oxygen supplement in the length direction of the sintering machine are realized, and the sintering gas volume demand and oxygen demand are matched as needed, so that the flue gas circulation ratio is increased to more than 35%, and the flue gas overflow is effectively avoided, which has no influence on sintering production.

In the description of the present disclosure, it should be understood that the terms "longitudinal", "transverse", "up", "down", "front", "back", "left", "right", "vertical", "horizontal", "top", "bottom", "inside", "outside", etc. indicate orientation or positional relationships based on the orientation or positional relationships shown in the accompanying drawings, only for the convenience of describing the present disclosure, and do not indicate or imply that the device or element referred to must have a specific orientation, be constructed and operated in a specific orientation, and therefore cannot be understood as a limitation of the present disclosure.

The above-mentioned embodiments only describe the preferred mode of the present disclosure, and do not limit the scope of the present disclosure. Under the premise of not departing from the design spirit of the present disclosure, various modifications and improvements made by one of ordinary skill in the art to the technical solution of the present disclosure should fall within the protection scope determined by the claims of the present disclosure.

What is claimed is:

1. A stepwise gas distribution and graded oxygen supplementation device for distribution of high-ratio circulating flue gas, comprising:
   a circulating flue gas distribution main pipe, wherein the circulating flue gas distribution main pipe comprises a plurality of stepped sections sequentially in communication with each other, and pipe diameters of the plurality of stepped sections are reduced in sequence along a flue gas moving direction; and oxygen content demands of the plurality of stepped sections arranged along the flue gas moving direction increase in sequence, and gas volume demands decrease in sequence;
   a plurality of circulating flue gas distribution branch pipes, each in communication with and arranged at one side of a corresponding one of the stepped sections;

a flue gas sealing cover in communication with gas outlet ends of the plurality of circulating flue gas distribution branch pipes;

oxygen supplementing devices arranged in the circulating flue gas distribution branch pipes needing to increase oxygen content; and an oxygen supply device in communication with gas inlet ends of the oxygen supplementing devices;

wherein the oxygen supplementing devices comprise a plurality of oxygen supplementing gas branch pipes, wherein the oxygen supplementing gas branch pipes are located below the respective circulating flue gas distribution branch pipes, the oxygen supplementing gas branch pipes are obliquely inserted into middle parts of the respective circulating flue gas distribution branch pipes, gas outlet ends of the oxygen supplementing gas branch pipes are in communication with the respective circulating flue gas distribution branch pipes, the gas outlet ends of the oxygen supplementing gas branch pipes are arranged close to the flue gas sealing cover, gas inlet ends of the oxygen supplementing gas branch pipes are arranged close to the circulating flue gas distribution main pipe, and the gas inlet ends of the plurality of oxygen supplementing gas branch pipes are in communication with gas outlet ends of the oxygen supply device; and middle parts of inner sides of the circulating flue gas distribution branch pipes are provided with conical flow guide devices, tips of the conical flow guide devices are arranged towards the flue gas sealing cover, and the gas outlet ends of the oxygen supplementing gas branch pipes are arranged towards side walls of the conical flow guide devices.

2. The stepwise gas distribution and graded oxygen supplementation device for distribution of high-ratio circulating flue gas according to claim 1, wherein the oxygen supplementing devices are arranged in the circulating flue gas distribution branch pipes located in final one-third length range of the circulating flue gas distribution main pipe along the flue gas moving direction.

3. The stepwise gas distribution and graded oxygen supplementation device for distribution of high-ratio circulating flue gas according to claim 1, wherein the oxygen supply device comprises an oxygen supplementing gas main pipe, a side wall of the oxygen supplementing gas main pipe is in communication with the gas inlet ends of the plurality of oxygen supplementing gas branch pipes, and adjusting parts for adjusting oxygen flow are arranged between the oxygen supplementing gas main pipe and the oxygen supplementing gas branch pipes.

4. The stepwise gas distribution and graded oxygen supplementation device for distribution of high-ratio circulating flue gas according to claim 3, wherein the adjusting parts comprise oxygen supplementing gas inlet adjusting valves, ends of the oxygen supplementing gas inlet adjusting valves are in communication with the side wall of the oxygen supplementing gas main pipe, and other ends of the oxygen supplementing gas inlet adjusting valves are in communication with the gas inlet ends of the oxygen supplementing gas branch pipes.

5. The stepwise gas distribution and graded oxygen supplementation device for distribution of high-ratio circulating flue gas according to claim 4, wherein each of the oxygen supplementing gas inlet adjusting valves is one of an adjustable single-board valve, a butterfly valve, or a gate valve.

* * * * *